(12) United States Patent
Li et al.

(10) Patent No.: US 9,380,464 B2
(45) Date of Patent: Jun. 28, 2016

(54) METHOD AND DEVICE FOR DETERMINING AND ASSISTING IN DETERMINING BACK-UP FREQUENCY IN COGNITIVE RADIO SYSTEM

(71) Applicant: China Academy of Telecommunications Technology, Beijing (CN)

(72) Inventors: Yuanyuan Li, Beijing (CN); Chenggang Jiang, Beijing (CN); Wenling Bai, Beijing (CN); Yu Yang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/408,770

(22) PCT Filed: Jun. 9, 2013

(86) PCT No.: PCT/CN2013/077037
§ 371 (c)(1),
(2) Date: Dec. 17, 2014

(87) PCT Pub. No.: WO2013/189251
PCT Pub. Date: Dec. 27, 2013

(65) Prior Publication Data
US 2015/0181438 A1    Jun. 25, 2015

(30) Foreign Application Priority Data
Jun. 18, 2012    (CN) .......................... 2012 1 0206033

(51) Int. Cl.
*H04W 16/14*    (2009.01)
*H04W 72/04*    (2009.01)

(52) U.S. Cl.
CPC .......... *H04W 16/14* (2013.01); *H04W 72/0453* (2013.01)

(58) Field of Classification Search
CPC . H04W 16/14; H04W 16/18; H04W 72/0453; G08B 6/00; G06F 3/04842; G06F 17/30675; G06N 99/005

USPC ........... 455/454, 452.2, 450, 67.11, 436, 509; 370/329
See application file for complete search history.

(56) References Cited

U.S. PATENT DOCUMENTS

| | | | |
|---|---|---|---|
| 2007/0117517 A1 | 5/2007 | Hui et al. | |
| 2008/0171546 A1 | 7/2008 | Hyon et al. | |
| 2009/0154409 A1* | 6/2009 | Kang | H04W 16/18 370/329 |
| 2010/0136974 A1 | 6/2010 | Kim et al. | |
| 2011/0312330 A1* | 12/2011 | Sadek | H04W 16/14 455/452.2 |

FOREIGN PATENT DOCUMENTS

| | | |
|---|---|---|
| CN | 102196452 | 9/2011 |
| CN | 102378286 | 3/2012 |

(Continued)

OTHER PUBLICATIONS

Extended European Search Report for EP Application No. 13806386.2 mailed Oct. 7, 2015.
(Continued)

*Primary Examiner* — Phuoc H Doan
(74) *Attorney, Agent, or Firm* — Foley & Lardner LLP; James F. Ewing; Paul M. H. Pua

(57) ABSTRACT

Disclosed are a method and device for determining and assisting in determining a back-up frequency in a cognitive radio system. A first cognitive system shares the wireless communication spectrum resources of an incumbent system, and the method thereof for determining a back-up frequency comprises: through a terminal, a first cognitive system obtaining a back-up frequency of a second cognitive system which has overlapping coverage in a target area in an overlapping coverage area; and according to the back-up frequency of the second cognitive system in the overlapping coverage area, selecting from the wireless communication spectrum resources at least one frequency as a back-up frequency in the target area. When determining the back-up frequency, the first cognitive system can refer to the back-up frequency of the second cognitive system to conduct determination, thereby optimizing the system performance.

17 Claims, 2 Drawing Sheets

(56) References Cited

FOREIGN PATENT DOCUMENTS

| | | |
|---|---|---|
| CN | 102457856 | 5/2012 |
| CN | 102457929 | 5/2012 |

OTHER PUBLICATIONS

International Search Report for PCT/CN2013/077037 mailed Sep. 19, 2013.

* cited by examiner

METHOD AND DEVICE FOR DETERMINING
AND ASSISTING IN DETERMINING
BACK-UP FREQUENCY IN COGNITIVE
RADIO SYSTEM

This application is the U.S. National Stage of International Application No. PCT/CN2013/077037 filed on 9 Jun. 2013, designating the United States, and claiming the benefit of Chinese Patent Application No. 201210206033.2, filed with the Chinese Patent Office on Jun. 18, 2012 and entitled "Method and device for determining and assisting in determining back-up frequency in cognitive radio system", which is hereby incorporated by reference in its entirety.

FIELD OF THE INVENTION

The present invention relates to the technical field of communications and particularly to a method and a device for determining and assisting in determining a back-up frequency in a cognitive radio system.

BACKGROUND OF THE INVENTION

The radio communication spectrums are precious natural resources. At present the radio communication spectrums are allocated in a fixed allocation scheme. Currently there have not been sufficient spectrum resources allocated to systems carrying a high amount of service bearer, whereas excessive spectrum resources have been occupied by some other systems carrying a low amount of service bearer. In order to satisfy the demand of the systems carrying a high amount of service bearer for the spectrum resources, the cognitive radio technology has emerged.

The concept of a cognitive system has been introduced to the cognitive radio technology, which is also referred to as spectrum sensing radio technology. For a radio communication spectrum allocated fixedly to an access system, the access system is an incumbent system. An access system using with the radio communication spectrum allocated to the incumbent system based upon the cognitive radio technology is a cognitive system.

The cognitive radio technology operates under such a principle that the cognitive system intelligently detects the current radio environment of the radio communication spectrum allocated to the incumbent system to thereby dynamically select an idle one of frequencies allocated to the incumbent system for communication under the premise that there no interference between the cognitive system and the incumbent system.

With the cognitive radio technology, the cognitive system maintains a list of back-up frequencies (also referred to as a list of candidate frequencies) and transmits the maintained list of back-up frequencies to a terminal accessing the cognitive system. Once the current operating frequency is unavailable, the base station of the cognitive system and the terminal accessing the cognitive system select one back-up frequency from the list of back-up frequencies and switch to the selected back-up frequency for reconnection. Preferably they switch to a back-up frequency ranked first in the list of back-up frequencies, and if the back-up frequency ranked first in the list of back-up frequencies is unavailable, then they switch to the one ranked next.

In the prior art, the cognitive system can not determine a back-up frequency with reference to the back-up frequencies of other cognitive systems so that neither the stability of the system can be ensured nor the performance of the system can be improved. Consequently the existing solution for determining the back-up frequency by the cognitive system remains to be further improved.

SUMMARY OF THE INVENTION

An object of the invention is to provide a method and a device for determining and assisting in determining a back-up frequency so as to address the issue of how to optimize the solution for determining the back-up frequency by the cognitive system.

The object of the invention is attained by the following technical solutions.

There is a method for determining a back-up frequency in a cognitive radio system including a first cognitive system, a second cognitive system and an incumbent system, where the method includes:

the first cognitive system obtaining, through a terminal, a back-up frequency, of the second cognitive system having overlap coverage in a target area, in an overlap coverage area; and the first cognitive system selecting at least one frequency from radio communication spectrum resources as a back-up frequency in the target area according to the back-up frequency of the second cognitive system in the overlap coverage area.

There is a method for assisting in determining a back-up frequency, where the method includes:

a terminal determining a back-up frequency, of a second cognitive system having overlap coverage in a target area, in an overlap coverage area, required to be transmitted to a first cognitive system; and the terminal transmitting the back-up frequency, of the second cognitive system having the overlap coverage in the target area, in the overlap coverage area to the first cognitive system so that the first cognitive system selects at least one frequency from radio communication spectrum resources as a back-up frequency in the target area according to the back-up frequency of the second cognitive system in the overlap coverage area.

There is a cognitive system which is a first cognitive system in a cognitive radio system including the first cognitive system, a second cognitive system and an incumbent system, where the cognitive system includes:

a reference back-up frequency obtaining module configured to obtain, through a terminal, a back-up frequency, of the second cognitive system having overlap coverage in a target area, in an overlap coverage area; and a back-up frequency determining module configured to select at least one frequency from radio communication spectrum resources as a back-up frequency in the target area according to the back-up frequency of the second cognitive system in the overlap coverage area.

There is a terminal including:

a reference back-up frequency obtaining module configured to obtain a back-up frequency of a second cognitive system in an overlap coverage area; and a reference back-up frequency transmitting module configured to transmit the back-up frequency, of the second cognitive system having overlap coverage in a target area, in the overlap coverage area to a first cognitive system when needed, so that the first cognitive system selects at least one frequency from radio communication spectrum resources as a back-up frequency in the target area according to the back-up frequency of the second cognitive system in the overlap coverage area.

With the methods and devices according to the embodiments of the invention, the first cognitive system obtains, through the terminal, the back-up frequency, of the second cognitive system having the overlap coverage in the target area, in the overlap coverage area, to thereby select the back-up frequency in the target area according to the back-up frequency of the second cognitive system in the overlap coverage area. The first cognitive system can determine the back-up frequency with reference to the back-up frequency of the second cognitive system to thereby optimize the performance of the system.

DETAILED DESCRIPTION OF THE EMBODIMENTS

An embodiment of the invention provides a method for determining a back-up frequency in a cognitive radio system including a first cognitive system, a second cognitive system and an incumbent system, where the first cognitive system is a cognitive system required to determine the back-up frequency, the second cognitive system is a cognitive system overlapping in coverage with the first cognitive system in a target area, and the second cognitive system may be one or more cognitive systems.

Figure 1:
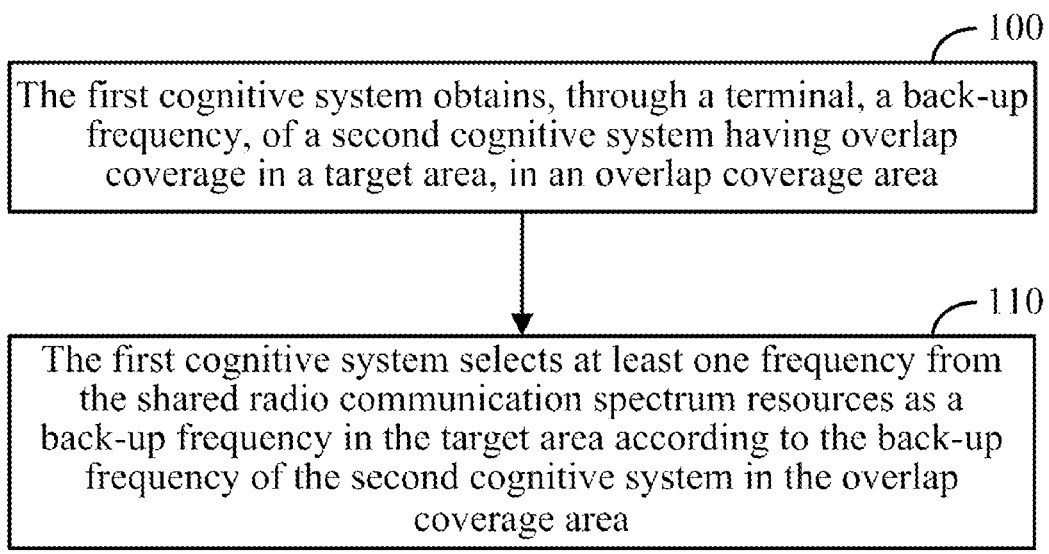
FIG. 1 is a flow chart of a method at the cognitive system side according to an embodiment of the invention.

Correspondingly, a method for determining the back-up frequency by the first cognitive system in the cognitive radio system according to an embodiment of the invention is as illustrated in FIG. 1, where a particular implementation of the method is as follows:

Operation 100: the first cognitive system obtains, through a terminal, a back-up frequency, of a second cognitive system having overlap coverage in a target area, in an overlap coverage area.

Each of the cognitive system may correspond to one cell or a plurality of cells. If the first cognitive system corresponds to one cell, then the target area refers to the coverage area of the cell; and if the first cognitive system corresponds to a plurality of cells, then the target area refers to the coverage area of the cells required to determine back-up frequencies currently.

If the second cognitive system corresponds to one cell, then the back-up frequency of the second cognitive system in the overlap coverage area particularly refers to a back-up frequency in the coverage area of the cell corresponding to the second cognitive system. If the second cognitive system corresponds to a plurality of cells, then the event that the second cognitive system has the overlap coverage in the target area refers to that the coverage area of at least one cell of the second cognitive system overlaps with the target area; and the back-up frequency of the second cognitive system in the overlap coverage area particularly refers to a back-up frequency of the second cognitive system in the coverage area of the at least one cell.

Operation 110: the first cognitive system selects at least one frequency from the shared radio communication spectrum resources as a back-up frequency in the target area according to the back-up frequency of the second cognitive system in the overlap coverage area.

In the method according to the embodiment of the invention, the first cognitive system obtains, through the terminal, the back-up frequency, of the second cognitive system having the overlap coverage in the target area, in the overlap coverage area, to thereby select the back-up frequency in the target area according to the back-up frequency of the second cognitive system in the overlap coverage area. The first cognitive system can determine the back-up frequency with reference to the back-up frequency of the second cognitive system to thereby optimize the performance of the system.

Preferably the back-up frequency of the first cognitive system is not the back-up frequency of the second cognitive system in the overlap coverage area. The first cognitive system selects the back-up frequency in the target area so that it is not the back-up frequency of the second cognitive system in the overlap coverage area. When the first cognitive system falls back to the determined back-up frequency in the target area, it will not collide with the second cognitive system at the back-up frequency of the second cognitive system in the overlap coverage area, so that expected performance of the system can be achieved and the stability of the system in operation can be improved.

In the operation 100 above, the first cognitive system can obtain on its own initiative the back-up frequency, of the second cognitive system having the overlap coverage in the target area, in the overlap coverage area, particularly as follows: the first cognitive system can transmit network side signaling to the terminal camping on or operating in its coverage area to obtain the back-up frequency of the second cognitive system in the overlap coverage area; or the first cognitive system can transmit network side signaling to the terminal camping on or operating in the target area to obtain the back-up frequency of the second cognitive system in the overlap coverage area; or the first cognitive system can transmit network side signaling to the terminal to obtain the back-up frequency of the second cognitive system in the overlap coverage area when the terminal accesses the first cognitive system. The network side signaling can be a broadcast message, a paging message or other common signaling or special signaling for obtaining the back-up frequency of the second cognitive system in the overlap coverage area.

In the operation 100 above, alternatively the terminal can report on its own initiative the back-up frequency, of the second cognitive system having the overlap coverage in the target area, in the overlap coverage area, particularly as follows: the first cognitive system can obtain the back-up frequency, of the second cognitive system having the overlap coverage in the target area, in the overlap coverage area reported by the terminal on its own initiative when the terminal accesses the first cognitive system in the target area; or the first cognitive system can obtain the back-up frequency, of the second cognitive system having the overlap coverage in the target area, in the overlap coverage area reported by the terminal camping on or operating in the target area on its own initiative.

The operation 100 above can be implemented particularly as follows: the first cognitive system obtains back-up frequencies of other cognitive systems, and the coverage areas corresponding to the back-up frequencies of the other cognitive systems, transmitted by the terminal; the first cognitive system determines one of the cognitive systems with a coverage area overlapping with the target area as the second cognitive system; and the first cognitive system obtains the back-up frequency of the second cognitive system in the overlap coverage area. As described above, each of the cognitive systems may correspond to one cell or a plurality of cells. If the cognitive system corresponds to one cell, then the back-up frequency is maintained for the cell, and the coverage area corresponding to the back-up frequency refers to the coverage area of the cell. If the cognitive system corresponds to a plurality of cells, then back-up frequencies are maintained respectively for the respective cells, and the coverage areas corresponding to the back-up frequencies refer to the coverage areas of the cells corresponding to the back-up frequencies.

The terminal will not receive any further message of a cognitive system after leaving the coverage area of the cognitive system so that the terminal can not be informed of a change to a back-up frequency of the cognitive system when the change occurs. In order to ensure effective information reported by the terminal to the first cognitive system, the operation 100 can alternatively be implemented particularly as follows: the first cognitive system obtains the back-up frequency of the second cognitive system in the overlap coverage area transmitted by the terminal and the instance of time when the terminal lastly obtains the back-up frequency of the second cognitive system in the overlap coverage area; and if the back-up frequencies of the same second cognitive system in the overlap coverage area transmitted by at least two terminals are obtained, then one of the back-up frequencies lastly obtained by the terminals at the latest one of the instances of time is selected as the back-up frequency of the second cognitive system in the overlap coverage area.

The method according to the embodiment of the invention can further include the following operation: the first cognitive system obtains an operating frequency of the second cognitive system in the overlap coverage area through the terminal Correspondingly the operation 110 above can be implemented particularly as follows: the first cognitive system selects the at least one frequency from the radio communication spectrum resources as the back-up frequency in the target area according to the back-up frequency of the second cognitive system in the overlap coverage area and the operating frequency of the second cognitive system in the overlap coverage area.

When the first cognitive system is required to fall back to the back-up frequency in the target area, the second cognitive system may still operate at the current operating frequency. In order to avoid that the first cognitive system falling back to the back-up frequency in the target area collides with the second cognitive system at the operating frequency of the second cognitive system, preferably the back-up frequency selected by the first cognitive system is not the operating frequency of the second cognitive system in the overlap coverage area either. For the illustration of the operating frequency of the second cognitive system in the overlap coverage area, reference can be made to the illustration above of the back-up frequency of the second cognitive system in the overlap coverage area, and a repeated description thereof will be omitted here.

Typically a cognitive system required to fall back from an operating frequency will switch to a back-up frequency ranked first in the list of back-up frequencies. In this case, the first cognitive system can obtain a first back-up frequency of the second cognitive system through the terminal and thus determine a first back-up frequency of the first cognitive system. Correspondingly the operation 110 above can alternatively be implemented particularly by determining, from the radio communication spectrum resources, candidate frequencies which do not include the first back-up frequency of the second cognitive system in the overlap coverage area, and selecting one of the candidate frequencies as the first back-up frequency under a predetermined selection rule.

The predetermined selection rule can be that a frequency which is valid for the longest period of time is selected or a frequency to be occupied by the incumbent system at the lowest probability is selected or another selection rule predetermined as needed in reality. If the frequency which is valid for the longest period of time is selected, then the first cognitive system can obtain the period of time during which the frequency is valid through intelligent learning or through the terminal or by accessing a network node where the period of time during which the frequency is valid is stored. The period of time during which a frequency is valid refers to a period of time during which the frequency is available to the cognitive system sharing the radio spectrum resources of the incumbent system.

The first back-up frequency refers to the back-up frequency ranked first in the list of back-up frequencies. In this case, the first cognitive system can obtain the list of back-up frequencies of the second cognitive system, or obtain the first back-up frequency of the second cognitive system.

In another case, the cognitive system falling back from the operating frequency switches to a back-up frequency other than the one ranked first in the list of back-up frequencies. In this case, in order to ensure the frequencies of the cognitive systems not to collide, the first cognitive system obtains all the back-up frequencies of the second cognitive system (which can be obtained in the form of a list of back-up frequencies without any limitation thereto) through the terminal, and the first cognitive system selects all the available frequencies from the radio communication spectrum resources as the back-up frequencies in the target area, where for the definition of an available frequency, reference can be made to the definition above of the back-up frequency selected by the first cognitive system, and a repeated description thereof will be omitted here.

Preferably when the first cognitive system selects the back-up frequency, it is further taken into account that whether there will be an influence upon normal operation of each other between the first cognitive system and the incumbent system when the first cognitive system falls back to the back-up frequency. Correspondingly the operation 110 above can be implemented particularly as follows: the first cognitive system selects, from the radio communication spectrum resources, frequencies other than the back-up frequency of the second cognitive system in the overlap coverage area; and the first cognitive system further determines the back-up frequency from the selected frequencies so that the first cognitive system can satisfy the principle of coexisting with the incumbent system if the first cognitive system switches to the back-up frequency. Correspondingly the operation 110 above can alternatively be implemented particularly as follows: the first cognitive system selects frequencies from the radio communication spectrum resources so that the first cognitive system can satisfy the principle of coexisting with the incumbent system if the first cognitive system switches to the selected frequencies; and the first cognitive system further determines, from the selected frequencies, a back-up frequency other than the back-up frequency of the second cognitive system in the overlap coverage area.

If two systems satisfy the coexisting principle, then there is no influence upon normal operation of each other between these two systems, where satisfying of the coexisting principle can refer to satisfying of the coexisting principle at the same frequency or satisfying of the coexisting principle at adjacent frequencies or satisfying of the coexisting principle at both the same frequency and adjacent frequencies. When the current operating frequency of the first cognitive system is unavailable and the first cognitive system is required to switch to the back-up frequency, possible scenarios can include but will not be limited to the following scenarios: (1) the incumbent system switches to the operating frequency of the first cognitive system, so when the first cognitive system switches to the back-up frequency, satisfying of the principle of coexisting with the incumbent system particularly refers to satisfying of the principle of coexisting with the incumbent system at adjacent frequencies; (2) the incumbent system still operates at the current operating frequency, and the first cognitive system is required to switch to the back-up frequency due to some other reason, so when the first cognitive system switches to the back-up frequency, satisfying of the principle of coexisting with the incumbent system particularly refers to satisfying of the coexisting principle at the same frequency if the switched-to back-up frequency is the operating frequency of the incumbent system; otherwise, satisfying of the coexisting principle at adjacent frequencies.

If the first cognitive system can predetermine that the incumbent system operates fixedly at its operating frequency, then the back-up frequency can be selected with reference to only the scenario (2) above. If the first cognitive system can not predicate the variation of the operating frequency of the incumbent system, then the back-up frequency will be selected with reference to both of the scenarios above. If both of the scenarios above are taken into account, that is, the event of satisfying the principle of coexisting with the incumbent system includes: the first cognitive system at the selected frequency or at the back-up frequency satisfies the principle of coexisting with the incumbent system at the same frequency or adjacent frequencies based upon the operating frequency of the incumbent system; or the first cognitive system at the selected frequency or at the back-up frequency satisfies the principle of coexisting with the incumbent system at adjacent frequencies based upon the operating frequency of the first cognitive system.

Figure 2:
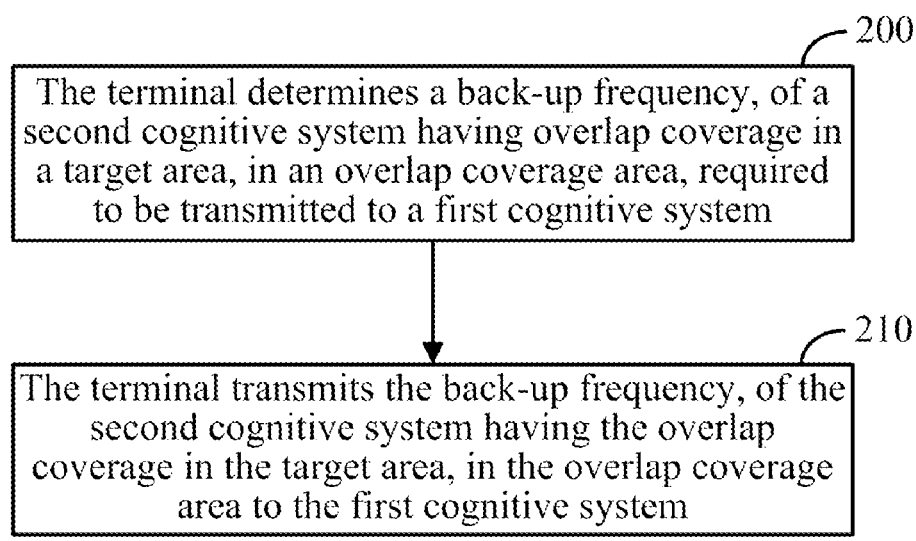
FIG. 2 is a flow chart of a method at the terminal side according to an embodiment of the invention.

Based upon the application scenario above, the invention further provides a method for assisting in determining a back-up frequency by a terminal, where a particular implementation of the method is as illustrated in FIG. 2 and particularly includes the following operations:

Operation 200: the terminal determines a back-up frequency, of a second cognitive system having overlap coverage in a target area, in an overlap coverage area, required to be transmitted to a first cognitive system.

Operation 210: the terminal transmits the back-up frequency, of the second cognitive system having the overlap coverage in the target area, in the overlap coverage area to the first cognitive system so that the first cognitive system selects at least one frequency from radio communication spectrum resources as a back-up frequency in the target area according to the back-up frequency of the second cognitive system in the overlap coverage area.

Particularly, the terminal can report on its own initiative the back-up frequency of the second cognitive system having the overlap coverage in the target area when the terminal accesses the first cognitive system in the target area, so the operation 200 is particularly as follows: the terminal determines the back-up frequency, of the second cognitive system having the overlap coverage in the target area, required to be transmitted to the first cognitive system when the terminal accesses the first cognitive system in the target area. Alternatively the terminal can report the back-up frequency of the second cognitive system having the overlap coverage in the target area according to the trigger made by the first cognitive system, so the operation 200 is particularly as follows: the terminal determines the back-up frequency, of the second cognitive system having the overlap coverage in the target area, required to be transmitted to the first cognitive system upon reception of a trigger report message from the first cognitive system.

Moreover the terminal reports the locally stored back-up frequency of the second cognitive system having the overlap coverage in the target area. Alternatively the terminal can obtain and then report, in the target area in real time, the back-up frequency of the second cognitive system having the overlap coverage in the target area.

In the method according to the embodiment of the invention, the first cognitive system obtains, through the terminal, the back-up frequency, of the second cognitive system having the overlap coverage in the target area, in the overlap coverage area, to thereby select the back-up frequency in the target area other than the back-up frequency of the second cognitive system in the overlap coverage area. When the first cognitive system falls back to the back-up frequency in the target area, it will not collide with the second cognitive system at the back-up frequency of the second cognitive system in the overlap coverage area, so that expected performance of the system can be achieved and the stability of the system in operation can be improved.

Before the operation 200 above, the following operations can be further included: the terminal searches the stored back-up frequencies of respective cognitive systems and the coverage areas corresponding to the back-up frequencies of the respective cognitive systems; and the terminal determines a cognitive system with a back-up frequency corresponding to the coverage area overlapping with the target area as the second cognitive system.

The terminal will not receive any further message of a cognitive system after leaving the coverage area of the cognitive system so that the terminal can not be informed of a change to a back-up frequency of the cognitive system when the change occurs. In order to ensure effective information reported by the terminal to the first cognitive system, the following operation can be further included: the terminal transmits the instance of time when the back-up frequency of the second cognitive system in the overlap coverage area is lastly obtained to the first cognitive system.

When the first cognitive system is required to fall back to the back-up frequency in the target area, the second cognitive system may still operate at the current operating frequency. In order to avoid that the first cognitive system falling back to the back-up frequency in the target area collides with the second cognitive system at the operating frequency of the second cognitive system, the method can further include the following operation: the terminal transmits the operating frequency of the second cognitive system in the overlap coverage area to the first cognitive system.

In order to ensure the validity of the back-up frequency of the cognitive system stored in the terminal, the period of time during which the back-up frequency is valid can further be stored. Taking the first cognitive system as an example, the method can further include the following operations: the terminal obtains and stores the back-up frequency of the first cognitive system in the target area and the period of time during which the back-up frequency of the first cognitive system in the target area is valid; and the terminal deletes the back-up frequency of the first cognitive system in the target area when the period of time, during which the back-up frequency of the first cognitive system in the target area is valid, expires.

Furthermore, the terminal can further request for the back-up frequency of the first cognitive system in the target area when the period of time, during which the back-up frequency of the first cognitive system in the target area is valid, expires.

An implementation of the method according to the invention in a particular application scenario will be described below in details by way of a particular application instance.

It is assumed that cognitive systems X, Y and Z share 8 frequencies, which are f0, f1, f2, f3, f4, f5, f6 and f7 respectively, over the radio communication spectrum resources of the incumbent system, where f0 is the current operating frequency of the first cognitive system, and f7 is the current operating frequency of the incumbent system. The cognitive systems X, Y and Z each correspond to one cell, so a first back-up frequency of the cognitive system Y in the target area can be simply referred to as a first back-up frequency of the cognitive system Y and determined as follows:

The cognitive system Y transmits signaling to terminals (assumed as a UE1, a UE2 and a UE3) accessing it or camping on/operating in its coverage area to obtain the frequency information of the cognitive system overlapping in coverage with its coverage area (i.e., the target area) (i.e., the second cognitive system).

Particularly the signaling carries information about the target area, i.e., in this application instance, the coverage area lastly obtained; and correspondingly the signaling can further carry an indication of the frequency information required to be obtained to indicate the frequency information to be reported by the terminal.

The terminal accessing the cognitive system Y or camping on/operating in its coverage area searches the stored frequencies (the operating frequencies and the first back-up frequencies) of the cognitive systems and the coverage areas corresponding to the respective frequencies upon reception of the signaling; determines a cognitive system at a frequency corresponding to the coverage area overlapping with the coverage area of the cognitive system Y; and transmits the frequency information of the determined cognitive system to the cognitive system Y.

By way of an example without any limitation thereto, the UE1 accessed the cognitive system Z, so the frequency information of the cognitive system Z is stored, particularly as depicted in Table 1:

TABLE 1

| Cognitive system name | Frequency attribute | Frequency number (or absolute frequency value) | Period of validity | Coverage area | Instance of time of being lastly obtained |
|---|---|---|---|---|---|
| Z | Operating frequency | f3 | (Starting: 24:00 on Jan. 1, 2012 and ending: unknown) | Geographical coordinates: (X2, Y2, Z2) and radius of R2 | 14:05 on Jan. 11, 2012 |
| | First back-up frequency | f4 | (Starting: 24:00 on Jan. 1, 2012 and ending: 24:00 on Jan. 15, 2012) | Geographical coordinates: (X2, Y2, Z2) and radius of R2 | 14:05 on Jan. 11, 2012 | of the cognitive system Y. If the cognitive system Y corresponds to a plurality of cells, then the information about the target area refers to the coverage area of one of the cells for which a first back-up frequency is required to be determined.

Particularly the frequency information can include but will not be limited to an operating frequency of the cognitive system, the coverage area corresponding to the operating frequency, the period of time during which the operating frequency is valid, the instance of time when the operating frequency is lastly obtained, a first back-up frequency of the cognitive system, the coverage area corresponding to the first back-up frequency, the period of time during which the first back-up frequency is valid and the instance of time when the first back-up frequency is lastly obtained. Frequency information required to be used by the cognitive system Y can include the operating frequency of the cognitive system, the instance of time when the operating frequency is lastly obtained, the first back-up frequency of the cognitive system and the instance of time when the first back-up frequency is Since the cognitive system Z corresponds to one cell, the coverage corresponding to the frequency (the operating frequency or the first back-up frequency) of the cognitive system Z is the coverage area of the cognitive system Z. In Table 1, the geographical coordinates ((X2, Y2, Z2)) are the location of the cognitive system Z.

The UE1 determines that both the coverage area corresponding to the operating frequency of the cognitive system Z and the coverage area corresponding to the first back-up frequency of the cognitive system Z overlap with the coverage area of the cognitive system Y and reports the operating frequency of the cognitive system Z, the instance of time when the operating frequency is lastly obtained, the first back-up frequency and the instance of time when the first back-up frequency is lastly obtained to the cognitive system Y.

The UE2 accessed the cognitive system X, so the frequency information of the cognitive system X is stored, particularly as depicted in Table 2:

TABLE 2

| Cognitive system name | Frequency attribute | Frequency number (or absolute frequency value) | Period of validity | Coverage area | Instance of time of being lastly obtained |
|---|---|---|---|---|---|
| X | Operating frequency | f1 | (Starting: 24:00 on Jan. | Geographical coordinates: | 13:05 on Jan. 10, |

TABLE 2-continued

| Cognitive system name | Frequency attribute | Frequency number (or absolute frequency value) | Period of validity | Coverage area | Instance of time of being lastly obtained |
|---|---|---|---|---|---|
| | | | 1, 2012 and ending: unknown) | (X1, Y1, Z1) and radius of R1 | 2012 |
| | First back-up frequency | f2 | (Starting: 24:00 on Jan. 1, 2012 and ending: 24:00 on Jan. 31, 2012) | Geographical coordinates: (X1, Y1, Z1) and radius of R1 | 13:05 on Jan. 10, 2012 |

The UE2 determines that both the coverage area corresponding to the operating frequency of the cognitive system X and the coverage area corresponding to the first back-up frequency of the cognitive system X overlap with the coverage area of the cognitive system Y and reports the operating frequency of the system X, the instance of time when the operating frequency is lastly obtained, the first back-up frequency and the instance of time when the first back-up frequency is lastly obtained to the cognitive system Y.

The UE3 accessed the cognitive system X, so the frequency information of the cognitive system X is stored, particularly as depicted in Table 3:

TABLE 3

| Cognitive system name | Frequency attribute | Frequency number (or absolute frequency value) | Period of validity | Coverage area | Instance of time of being lastly obtained |
|---|---|---|---|---|---|
| X | Operating frequency | f1 | (Starting: 24:00 on Jan. 1, 2012 and ending: unknown) | Geographical coordinates: (X1, Y1, Z1) and radius of R1 | 09:05 on Jan. 10, 2012 |
| | First back-up frequency | f2 | (Starting: 24:00 on Jan. 1, 2012 and ending: 24:00 on Jan. 31, 2012) | Geographical coordinates: (X1, Y1, Z1) and radius of R1 | 09:05 on Jan. 10, 2012 |

The UE3 determines that both the coverage area corresponding to the operating frequency of the cognitive system Z and the coverage area corresponding to the first back-up frequency of the cognitive system Z overlap with the coverage area of the cognitive system Y and reports the operating frequency of the cognitive system Z, the instance of time when the operating frequency is lastly obtained, the first back-up frequency and the instance of time when the first back-up frequency is lastly obtained to the cognitive system Y.

The cognitive system Y judges whether the respective frequencies in the shared radio spectrum resources enable the first cognitive system to satisfy the principle of coexisting with the incumbent system. At the operating frequency f7 of the incumbent system, that is, it is assumed that the incumbent system still operates at the frequency f7 when the first cognitive system is required to fall back from the operating frequency, then the judging of the coexisting principle includes: for the operating frequency f7 of the incumbent system, it is judged whether the cognitive system Y satisfies the principle of coexisting with the incumbent system at the same frequency, particularly by judging whether the distance between the cognitive system Y and the incumbent system is larger than a distance required for the coexistence at the same frequency, and if so, the coexisting principle at the same frequency is satisfied; otherwise, the coexisting principle at the same frequency is not satisfied; and for another frequency, it is judged whether the cognitive system Y satisfies the principle of coexisting with the incumbent system at adjacent frequencies, particularly by judging whether the distance between the cognitive system Y and the incumbent system is larger than a distance required for the coexistence at adjacent frequencies, and if so, the coexisting principle at adjacent frequencies is satisfied; otherwise, the coexisting principle at adjacent frequencies is not satisfied. At the operating frequency f0 of the first cognitive system, that is, it is assumed that the incumbent system operates at the frequency f0 when the first cognitive system is required to fall back from the operating frequency, then judging of the coexisting principle includes: for the frequencies f1 to f7, it is judged whether the cognitive system Y satisfies the principle of coexisting with the incumbent system at adjacent frequencies, particularly by judging whether the distance between the cognitive system Y and the incumbent system is larger than the distance required for coexistence at adjacent frequencies, and if so, the coexisting principle at adjacent frequencies is satisfied; otherwise, the coexisting principle at adjacent frequencies is not satisfied. It is assumed that the coexisting principle is satisfied for the frequencies f1 to f6, where the first cognitive system can obtain the operating frequency of the incumbent system through intelligent cognition or otherwise.

The cognitive system Y selects one of the frequencies f1 to f6, which is neither the frequency (the operating frequency and the first back-up frequency) of the cognitive system X nor the frequency (the operating frequency and the first back-up frequency) of the cognitive system Z. Since both the UE2 and the UE3 report the frequency information of the cognitive system X, then the cognitive system Y determines from the instances of time, when the frequency information is lastly obtained, reported by the terminals that the frequency information reported by the UE2 applies. The frequencies selected by the cognitive system Y are f5 and f6 according to the respective tables above.

One of f5 and f6 is selected as the first back-up frequency of the cognitive system Y under the predetermined selection rule. For example, the frequency which is valid for the longer period of time (assumed as f6) is selected as the first back-up frequency of the cognitive system Y.

The cognitive system Y transmits the determined first back-up frequency to the terminals accessing the cognitive system Y or camping on/operating in its coverage area, i.e., the UE1, the UE2 and the UE3. Moreover the cognitive system Y can further transmit the information about the coverage area, the valid period of time and the like corresponding to the first back-up frequency to the terminals in its coverage area. Correspondingly the terminal stores the first back-up frequency of the cognitive system Y and optionally stores the information about the coverage area, the valid period of time, the instance of time when it is lastly obtained and the like corresponding to the first back-up frequency of the cognitive system Y, and further stores the operating frequency of the cognitive system Y and the information about the coverage area, the valid period of time, the instance of time when it is lastly obtained and the like corresponding to the operating frequency of the cognitive system Y.

The terminal deletes the stored first back-up frequency (or operating frequency) and information relevant thereto when the period of time, during which the first back-up frequency (or the operating frequency) is valid, expires.

The terminal can obtain the frequency information of the accessed cognitive system periodically, or can read the frequency information of the accessed cognitive system via triggering by an event. The implementation of reading the frequency information via triggering by an event can be as follows without any limitation thereto: when the period of time, during which the first back-up frequency (or operating frequency) corresponding to some coverage area of some cognitive system stored by the terminal is valid, expires, and the terminal still camps/operates in this coverage area of the cognitive system, then the terminal requests again for the first back-up frequency (or the operating frequency) corresponding to the cognitive system in the coverage area. Alternatively, reading of the information can be triggered by network side signaling.

An implementation of the method according to the invention in a particular application scenario will be described below in details by way of another particular application instance.

It is assumed that cognitive systems X, Y and Z share 9 frequencies, which are f0, f1, f2, f3, f4, f5, f6, f7 and f8 respectively, over the radio communication spectrum resources of the incumbent system, where f0 is the current operating frequency of the first cognitive system, and f7 is the current operating frequency of the incumbent system. The cognitive systems X, Y and Z each correspond to one cell, so back-up frequencies of the cognitive system Y in the target area can be simply referred to as back-up frequencies of the cognitive system Y and determined as follows:

The cognitive system Y transmits signaling to terminals (assumed as a UE1, a UE2 and a UE3) accessing it or camping on/operating in its coverage area to obtain the frequency information of the cognitive system overlapping in coverage with its coverage area (i.e., the target area) (i.e., the second cognitive system).

Particularly the signaling carries information about the target area, i.e., the coverage area of the cognitive system Y in this application embodiment. If the cognitive system Y corresponds to a plurality of cells, then the information about the target area refers to the coverage area of one of the cells for which back-up frequencies are to be determined.

Particularly the frequency information can include but will not be limited to an operating frequency of the cognitive system, the coverage corresponding to the operating frequency, the period of time during which the operating frequency is valid, an instance of time when the operating frequency is lastly obtained, respective back-up frequencies of the cognitive system, the coverage corresponding to the respective back-up frequencies, the periods of time during which the respective back-up frequencies are valid and the instances of time when the respective back-up frequencies were lastly obtained. Frequency information required to be used by the cognitive system Y can include the operating frequency of the cognitive system, the instance of time when the operating frequency is lastly obtained, the respective back-up frequencies of the cognitive system and the instances of time when the respective back-up frequencies were lastly obtained; and correspondingly the signaling can further carry an indication of the frequency information required to be obtained to indicate the frequency information to be reported by the terminal.

The terminal accessing the cognitive system Y or camping on/operating in its coverage area searches the stored frequencies (the operating frequencies and the first back-up frequencies) of the cognitive systems and coverage areas corresponding to the respective frequencies upon reception of the signaling; determines a cognitive system at a frequency corresponding to the coverage area overlapping with the coverage area of the cognitive system Y; and transmits the frequency information of the determined cognitive system to the cognitive system Y.

By way of an example without any limitation thereto, the UE1 accessed the cognitive system Z, so the frequency information of the cognitive system Z is stored, particularly as depicted in Table 1:

TABLE 1

| Cognitive system name | Frequency attribute | Frequency number (or absolute frequency value) | Period of validity | Coverage area | Instance of time of being lastly obtained |
| --- | --- | --- | --- | --- | --- |
| Z | Operating frequency | f3 | (Starting: 24:00 on Jan. 1, 2012 and ending: unknown) | Geographical coordinates: (X2, Y2, Z2) and radius of R2 | 14:05 on Jan. 11, 2012 |
| | Back-up frequency | f4 | (Starting: 24:00 on Jan. | Geographical coordinates: | 14:05 on Jan. 11, |

TABLE 1-continued

| Cognitive system name | Frequency attribute | Frequency number (or absolute frequency value) | Period of validity | Coverage area | Instance of time of being lastly obtained |
|---|---|---|---|---|---|
| | | | 1, 2012 and ending: 24:00 on Jan. 15, 2012) | (X2, Y2, Z2) and radius of R2 | 2012 |

Since the cognitive system Z corresponds to one cell, the coverage area corresponding to the frequency (the operating frequency or the back-up frequency) of the cognitive system Z is the coverage area of the cognitive system Z. In Table 1, the geographical coordinates (X2, Y2, Z2) are the location of the cognitive system Z.

The UE1 determines that both the coverage area corresponding to the operating frequency of the cognitive system Z and the coverage area corresponding to the back-up frequency of the cognitive system Z overlap with the coverage area of the cognitive system Y, and reports the operating frequency of the cognitive system Z, the instance of time when the operating frequency is lastly obtained, the back-up frequency and the instance of time when the back-up frequency is lastly obtained to the cognitive system Y.

The UE2 accessed the cognitive system X, so the frequency information of the cognitive system X is stored, particularly as depicted in Table 2:

TABLE 2

| Cognitive system name | Frequency attribute | Frequency number (or absolute frequency value) | Period of validity | Coverage area | Instance of time of being lastly obtained |
|---|---|---|---|---|---|
| X | Operating frequency | f1 | (Starting: 24:00 on Jan. 1, 2012 and ending: unknown) | Geographical coordinates: (X1, Y1, Z1) and radius of R1 | 13:05 on Jan. 10, 2012 |
| | Back-up frequency | f2 | (Starting: 24:00 on Jan. 1, 2012 and ending: 24:00 on Jan. 31, 2012) | Geographical coordinates: (X1, Y1, Z1) and radius of R1 | 13:05 on Jan. 10, 2012 |
| | Back-up frequency | f6 | (Starting: 24:00 on Jan. 2, 2012 and ending: 24:00 on Jan. 6, 2012) | Geographical coordinates: (X1, Y1, Z1) and radius of R1 | 13:05 on Jan. 10, 2012 |

The UE2 determines that all the coverage area corresponding to the operating frequency and the coverage areas corresponding to the respective back-up frequencies of the cognitive system X overlap with the coverage area of the cognitive system Y, and reports the operating frequency of the system X, the instance of time when the operating frequency is lastly obtained, the respective back-up frequencies and the instances of time when the respective back-up frequencies were lastly obtained to the cognitive system Y.

The UE3 accessed the cognitive system X, so the frequency information of the cognitive system X is stored, particularly as depicted in Table 3:

TABLE 3

| Cognitive system name | Frequency attribute | Frequency number (or absolute frequency value) | Period of validity | Coverage area | Instance of time of being lastly obtained |
|---|---|---|---|---|---|
| X | Operating frequency | f1 | (Starting: 24:00 on Jan. 1, 2012 and ending: unknown) | Geographical coordinates: (X1, Y1, Z1) and radius of R1 | 09:05 on Jan. 10, 2012 |

TABLE 3-continued

| Cognitive system name | Frequency attribute | Frequency number (or absolute frequency value) | Period of validity | Coverage area | Instance of time of being lastly obtained |
|---|---|---|---|---|---|
| | Back-up frequency | f2 | (Starting: 24:00 on Jan. 1, 2012 and ending: 24:00 on Jan. 31, 2012) | Geographical coordinates: (X1, Y1, Z1) and radius of R1 | 09:05 on Jan. 10, 2012 |
| | Back-up frequency | f3 | (Starting: 24:00 on Jan. 2, 2012 and ending: 24:00 on Jan. 6, 2012) | Geographical coordinates: (X1, Y1, Z1) and radius of R1 | 09:05 on Jan. 10, 2012 |

The UE3 determines that all the coverage area corresponding to the operating frequency of the cognitive system Z and the coverage areas corresponding to the respective back-up frequencies of the cognitive system Z overlap with the coverage area of the cognitive system Y, and reports the operating frequency of the cognitive system Z, the instance of time when the operating frequency is lastly obtained, the respective back-up frequencies and the instances of time when the respective back-up frequencies were lastly obtained to the cognitive system Y.

The cognitive system Y judges whether the respective frequencies in the shared radio spectrum resources enable the first cognitive system to satisfy the principle of coexisting with the incumbent system. At the operating frequency f7 of the incumbent system, that is, it is assumed that the incumbent system still operates at the frequency f7 when the first cognitive system is required to fall back from the operating frequency, then the judging of the coexisting principle includes: for the operating frequency f7 of the incumbent system, it is judged whether the cognitive system Y satisfies the principle of coexisting with the incumbent system at the same frequency, particularly by judging whether the distance between the cognitive system Y and the incumbent system is larger than a distance required for the coexistence at the same frequency, and if so, the coexisting principle at the same frequency is satisfied; otherwise, the coexisting principle at the same frequency is not satisfied; and for another frequency, it is judged whether the cognitive system Y satisfies the principle of coexisting with the incumbent system at adjacent frequencies, particularly by judging whether the distance between the cognitive system Y and the incumbent system is larger than a distance required for the coexistence at adjacent frequencies, and if so, the coexisting principle at adjacent frequencies is satisfied; otherwise, the coexisting principle at adjacent frequencies is not satisfied. At the operating frequency f0 of the first cognitive system, that is, it is assumed that the incumbent system operates at the frequency f0 when the first cognitive system is required to fall back from the operating frequency, then judging of the coexisting principle includes: for the frequencies f1 to f7, it is judged whether the cognitive system Y satisfies the principle of coexisting with the incumbent system at adjacent frequencies, particularly by judging whether the distance between the cognitive system Y and the incumbent system is larger than the distance required for coexistence at adjacent frequencies, and if so, the coexisting principle at adjacent frequencies is satisfied; otherwise, the coexisting principle at adjacent frequencies is not satisfied. It is assumed that the coexisting principle is satisfied for the frequencies f1 to f6 and f8, where the first cognitive system can obtain the operating frequency of the incumbent system through intelligent cognition or otherwise.

The cognitive system Y selects one of the frequencies f1 to f6 and f8, which is neither the frequency (the operating frequency and the back-up frequency) of the cognitive system X nor the frequency (the operating frequency and the back-up frequency) of the cognitive system Z. Since both the UE2 and the UE3 report the frequency information of the cognitive system X, then the cognitive system Y determines from the instances of time, when the frequency information is lastly obtained, reported by the terminals that the frequency information reported by the UE2 is applied. The cognitive system Y selects the frequencies f5 and f8 as its back-up frequencies according to the respective tables above.

Furthermore the cognitive system Y can further rank the determined back-up frequencies under a predetermined rule. When it is necessary to fall back to the back-up frequency, the back-up frequency ranked earlier is selected for switching.

For example, they can be ranked in a descending order of the lengths of the periods of validity so that a back-up frequency which is valid for a longer period of time is ranked earlier.

The cognitive system Y transmits the determined back-up frequencies to the terminals accessing it or camping on/operating in its coverage area, i.e., the UE1, the UE2 and the UE3. If the respective back-up frequencies are further ranked, then information about the ranking is further transmitted to the terminal. Moreover the cognitive system Y can further transmit the information about the coverage areas, the valid periods of time and the like corresponding to the back-up frequencies to the terminals in its coverage area. Correspondingly the terminals store the back-up frequencies of the cognitive system Y, and optionally store the information about the coverage areas, the valid periods of time, the instances of time when they are lastly obtained and the like corresponding to the respective back-up frequencies of the cognitive system Y, and further store the operating frequency of the cognitive system Y and the information about the coverage area, the valid period of time, the instance of time when it is lastly obtained and the like corresponding to the operating frequency of the cognitive system Y.

The terminal deletes the stored back-up frequency (or operating frequency) and information relevant thereto when the period of time, during which the back-up frequency (or the operating frequency) is valid, expires.

The terminal can obtain the frequency information of the accessed cognitive system periodically, or can read the frequency information of the accessed cognitive system via triggering by an event. The implementation of reading the frequency information via triggering by an event can be as follows without any limitation thereto: when the period of time, during which the back-up frequency (or operating frequency) corresponding to some coverage area of some cognitive system stored by the terminal is valid, expires, and the terminal still camps/operates in this coverage area of the cognitive system, then the terminal requests again for the back-up frequency (or the operating frequency) corresponding to the cognitive system in the coverage area. Alternatively, reading of the information can be triggered by network side signaling.

Figure 3:
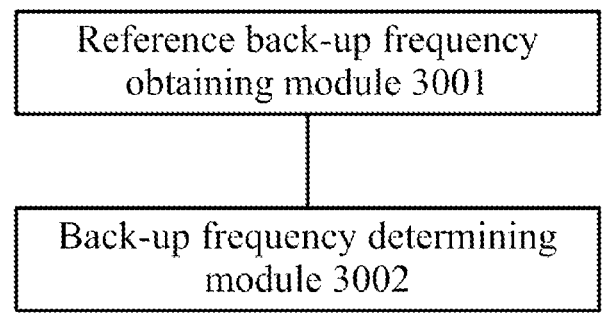
FIG. 3 is a schematic structural diagram of a cognitive system according to an embodiment of the invention.

The invention further provides a cognitive system which is a first cognitive system in a cognitive radio system including the first cognitive system, a second cognitive system and an incumbent system, and the structure of the cognitive system is as illustrated in FIG. 3 and generally includes:

A reference back-up frequency obtaining module 3001, which is configured to obtain, through a terminal, a back-up frequency, of the second cognitive system having overlap coverage in a target area, in an overlap coverage area.

A back-up frequency determining module 3002, which is configured to select at least one frequency from radio communication spectrum resources as a back-up frequency in the target area according to the back-up frequency of the second cognitive system in the overlap coverage area.

Preferably the selected back-up frequency is not the back-up frequency of the second cognitive system in the overlap coverage area.

The reference back-up frequency obtaining module 3001 and the back-up frequency determining module 3002 can be implemented as a base station in the cognitive system or another functional entity in the cognitive system.

The reference back-up frequency obtaining module 3001 is particularly configured to receive back-up frequencies of respective cognitive systems, and coverage areas corresponding to the back-up frequencies of the respective cognitive systems, transmitted by the terminal; to determine one of the cognitive systems with a coverage area overlapping with the target area as the second cognitive system; and to obtain the back-up frequency of the second cognitive system in the overlap coverage area.

The terminal will not receive any further message of a cognitive system after leaving the coverage area of the cognitive system so that the terminal can not be informed of a change to a back-up frequency of the cognitive system when the change occurs. In order to ensure the validity of the information reported by the terminal to the cognitive system, the reference back-up frequency obtaining module 3001 can be particularly configured to obtain the back-up frequency of the second cognitive system in the overlap coverage area transmitted by the terminal and an instance of time when the terminal lastly obtains the back-up frequency of the second cognitive system in the overlap coverage area; and if back-up frequencies of the same second cognitive system in the overlap coverage area transmitted by at least two terminals are obtained, to select one of the back-up frequencies lastly obtained the terminals at the latest one of the instances of time as the back-up frequency of the second cognitive system in the overlap coverage area.

The cognitive system according to the invention can further include a reference operating frequency obtaining module, which is configured to obtain an operating frequency of the second cognitive system in the overlap coverage area through the terminal; and the back-up frequency determining module is particularly configured to select the at least one frequency from the radio communication spectrum resources as the back-up frequency in the target area according to the back-up frequency of the second cognitive system in the overlap coverage area and the operating frequency of the second cognitive system in the overlap coverage area.

When the first cognitive system is required to fall back to the back-up frequency in the target area, the second cognitive system may still operate at the current operating frequency. In order to avoid that the first cognitive system falling back to the back-up frequency in the target area collides with the second cognitive system at the operating frequency of the second cognitive system, the back-up frequency selected by the back-up frequency determining module 3002 is not the operating frequency of the second cognitive system in the overlap coverage area either.

Typically a cognitive system required to fall back from an operating frequency will switch to a back-up frequency ranked first in the list of back-up frequencies. In this case, the first cognitive system can obtain a first back-up frequency of the second cognitive system through the terminal and thus determine a first back-up frequency of the first cognitive system. Correspondingly the back-up frequency determining module 3002 can be particularly configured to determine candidate frequencies from the radio communication spectrum resources, where the candidate frequencies do not include a first back-up frequency of the second cognitive system in the overlap coverage area; and to select one of the candidate frequencies as a first back-up frequency under a predetermined selection rule.

The first back-up frequency refers to a back-up frequency ranked first in the list of back-up frequencies. In this case, the first cognitive system can obtain the list of back-up frequencies of the second cognitive system, or the first back-up frequency of the second cognitive system.

In another case, the cognitive system falling back from the operating frequency switches to a back-up frequency other than the one ranked first in the list of back-up frequencies. In this case, in order to ensure the frequencies of the cognitive systems not to collide, the first cognitive system obtains all the back-up frequencies of the second cognitive system (which can be obtained in the form of a list of back-up frequencies without any limitation thereto) through the terminal, and the back-up frequency determining module 3002 selects all the available frequencies in the radio communication spectrum resources as the back-up frequencies in the target area, where for the definition of an available frequency, reference can be made to the definition above of the back-up frequency selected by the first cognitive system, and a repeated description thereof will be omitted here.

Preferably when the first cognitive system selects the back-up frequency, it is further taken into account that whether there will be an influence upon normal operation of each other between the first cognitive system and the incumbent system when the first cognitive system falls back to the back-up frequency. Correspondingly the back-up frequency determining module 3002 can be particularly configured to select, from the radio communication spectrum resources, frequencies other than the back-up frequency of the second cognitive system in the overlap coverage area; and to determine the back-up frequency from the selected frequencies, so that the cognitive system satisfies the principle of coexisting with the incumbent system if the cognitive system switches to the back-up frequency. Alternatively the back-up frequency determining module 3002 is particularly configured to select frequencies from the radio communication spectrum resources so that the first cognitive system satisfies the principle of coexisting with the incumbent system if the first cognitive system switches to the selected frequencies; and to determine the back-up frequency from the selected frequencies, where the back-up frequency is not the back-up frequency of the second cognitive system in the overlap coverage area.

Figure 4:
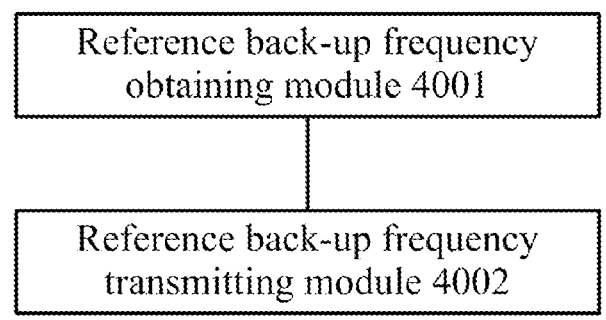
FIG. 4 is a schematic structural diagram of a terminal according to an embodiment of the invention.

Based upon an application scenario in which the first cognitive system shares the radio communication spectrum resources of the incumbent system, the invention further provides a terminal, and a structure of the terminal is as illustrated in FIG. 4 and generally includes:

A reference back-up frequency obtaining module 4001, which is configured to obtain a back-up frequency of a second cognitive system in an overlap coverage area; and A reference back-up frequency transmitting module 4002, which is configured to transmit the back-up frequency, of the second cognitive system having overlap coverage in a target area, in the overlap coverage area to a first cognitive system when needed, so that the first cognitive system selects at least one frequency from radio communication spectrum resources as a back-up frequency in the target area according to the back-up frequency of the second cognitive system in the overlap coverage area.

The reference back-up frequency obtaining module 4001 can be further configured to search stored back-up frequencies of respective cognitive systems and coverage areas corresponding to the back-up frequencies of the respective cognitive systems and to determine one of the cognitive systems with a back-up frequency corresponding to a coverage area overlapping with the target area as the second cognitive system.

The terminal will not receive any further message of a cognitive system after leaving a coverage area of the cognitive system so that the terminal can not be informed of a change to a back-up frequency of the cognitive system when the change occurs. In order to ensure the validity of the information reported by the terminal to the first cognitive system, the reference back-up frequency transmitting module 4002 can be further configured to transmit an instance of time when the back-up frequency of the second cognitive system in the overlap coverage area is lastly obtained to the first cognitive system.

When the first cognitive system is required to fall back to the first back-up frequency in the target area, the second cognitive system may still operate at the current operating frequency. In order to avoid that the first cognitive system falling back to the back-up frequency in the target area collides with the second cognitive system at the operating frequency of the second cognitive system, the terminal according to the invention can further include a reference operating frequency transmitting module, which is configured to transmit the operating frequency of the second cognitive system in the overlap coverage area to the first cognitive system.

In order to ensure the validity of a back-up frequency of a cognitive system stored by the terminal, the period of time during which the back-up frequency is valid can be further stored. Taking the first cognitive system as an example, the reference back-up frequency obtaining module 4001 can be further configured to obtain and store the back-up frequency of the first cognitive system in the target area and a period of time during which the back-up frequency of the first cognitive system in the target area is valid; and to delete the back-up frequency of the first cognitive system in the target area when the period of time, during which the back-up frequency of the first cognitive system in the target area is valid, expires.

Furthermore the reference back-up frequency obtaining module 4001 can be further configured to request for the back-up frequency of the first cognitive system in the target area when the period of time, during which the back-up frequency of the first cognitive system in the target area is valid, expires.

In the product according to the embodiment of the invention, the first cognitive system obtains, through the terminal, the back-up frequency, of the second cognitive system having the overlap coverage in the target area, in the overlap coverage area, to thereby select the back-up frequency in the target area other than the back-up frequency of the second cognitive system in the overlap coverage area. When the first cognitive system falls back to the determined back-up frequency in the target area, it will not collide with the second cognitive system at the back-up frequency of the second cognitive system in the overlap coverage area, so that expected performance of the system can be achieved and the stability of the system in operation can be improved.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining a back-up frequency in a cognitive radio system comprising a first cognitive system, a second cognitive system and an incumbent system, wherein the method comprises:
the first cognitive system obtaining, through a terminal, a back-up frequency, of the second cognitive system having overlap coverage in a target area, in an overlap coverage area; and
the first cognitive system selecting at least one frequency from radio communication spectrum resources as a back-up frequency in the target area according to the back-up frequency of the second cognitive system in the overlap coverage area.

2. The method according to claim 1, wherein the selected back-up frequency is not the back-up frequency of the second cognitive system in the overlap coverage area.

3. The method according to claim 2, wherein before the first cognitive system selects the at least one frequency from the radio communication spectrum resources as the back-up frequency in the target area, the method further comprises:
the first cognitive system obtaining an operating frequency of the second cognitive system in the overlap coverage area through the terminal; and
the first cognitive system selecting the at least one frequency from the radio communication spectrum resources as the back-up frequency in the target area according to the back-up frequency of the second cognitive system in the overlap coverage area comprises:
the first cognitive system selecting the at least one frequency from the radio communication spectrum resources as the back-up frequency in the target area according to the back-up frequency of the second cognitive system in the overlap coverage area and the operating frequency of the second cognitive system in the overlap coverage area.

4. The method according to claim 3, wherein the back-up frequency selected by the first cognitive system is not the operating frequency of the second cognitive system in the overlap coverage area either.

5. The method according to claim 2, wherein the first cognitive system selecting the at least one frequency from the radio communication spectrum resources as the back-up frequency according to the back-up frequency of the second cognitive system in the overlap coverage area comprises:
the first cognitive system determining candidate frequencies from the radio communication spectrum resources, wherein the candidate frequencies do not include a first back-up frequency of the second cognitive system in the overlap coverage area; and
the first cognitive system selecting one of the candidate frequencies as a first back-up frequency under a predetermined selection rule.

6. The method according to claim 2, wherein the first cognitive system selecting the at least one frequency from the radio communication spectrum resources as the back-up frequency in the target area according to the back-up frequency of the second cognitive system in the overlap coverage area comprises:

the first cognitive system selecting, from the radio communication spectrum resources, frequencies other than the back-up frequency of the second cognitive system in the overlap coverage area; and the first cognitive system determining the back-up frequency from the selected frequencies, so that the first cognitive system satisfies a principle of coexisting with the incumbent system if the first cognitive system switches to the back-up frequency; or
the first cognitive system selecting frequencies from the radio communication spectrum resources so that the first cognitive system satisfies the principle of coexisting with the incumbent system if the first cognitive system switches to the selected frequencies; and the first cognitive system determining the back-up frequency from the selected frequencies, wherein the back-up frequency is not the back-up frequency of the second cognitive system in the overlap coverage area.

7. The method according to claim 6, wherein satisfying the principle of coexisting with the incumbent system comprises:
the first cognitive system at the selected frequency or the back-up frequency satisfying the principle of coexisting with the incumbent system at the same frequency or adjacent frequencies based upon an operating frequency of the incumbent system;
the first cognitive system at the selected frequency or the back-up frequency satisfying the principle of coexisting with the incumbent system at adjacent frequencies based upon an operating frequency of the first cognitive system.

8. The method according to claim 1, wherein the first cognitive system obtaining, through the terminal, the back-up frequency, of the second cognitive system having the overlap coverage in the target area, in the overlap coverage area comprises:
the first cognitive system receiving back-up frequencies of respective cognitive systems, and coverage areas corresponding to the back-up frequencies of the respective cognitive systems, transmitted by the terminal;
the first cognitive system determining one of the cognitive systems with a coverage area overlapping with the target area as the second cognitive system; and
the first cognitive system obtaining the back-up frequency of the second cognitive system in the overlap coverage area.

9. The method according to claim 1, wherein the first cognitive system obtaining, through the terminal, the back-up frequency, of the second cognitive system having the overlap coverage in the target area, in the overlap coverage area comprises:
the first cognitive system obtaining the back-up frequency of the second cognitive system in the overlap coverage area transmitted by the terminal and an instance of time when the terminal lastly obtains the back-up frequency of the second cognitive system in the overlap coverage area; and
if back-up frequencies of the same second cognitive system in the overlap coverage area transmitted by at least two terminals are obtained, then the first cognitive system selecting one of the back-up frequencies lastly obtained the terminals at a latest one of instances of time as the back-up frequency of the second cognitive system in the overlap coverage area.

10. A method for assisting in determining a back-up frequency, comprising:
a terminal determining a back-up frequency, of a second cognitive system having overlap coverage in a target area, in an overlap coverage area, required to be transmitted to a first cognitive system; and the terminal transmitting the back-up frequency, of the second cognitive system having the overlap coverage in the target area, in the overlap coverage area to the first cognitive system so that the first cognitive system selects at least one frequency from radio communication spectrum resources as a back-up frequency in the target area according to the back-up frequency of the second cognitive system in the overlap coverage area.

11. The method according to claim 10, wherein before the terminal transmits the back-up frequency, of the second cognitive system having the overlap coverage in the target area, in the overlap coverage area to the first cognitive system, the method further comprises:

the terminal searching stored back-up frequencies of respective cognitive systems and coverage areas corresponding to the back-up frequencies of the respective cognitive systems; and the terminal determining one of the cognitive systems with a back-up frequency corresponding to a coverage area overlapping with the target area as the second cognitive system.

12. The method according to claim 10, further comprising:
the terminal transmitting an instance of time when the back-up frequency of the second cognitive system in the overlap coverage area is lastly obtained to the first cognitive system.

13. The method according to claim 10, further comprising:
the terminal transmitting an operating frequency of the second cognitive system in the overlap coverage area to the first cognitive system.

14. The method according to claim 10, further comprising:
the terminal obtaining and storing the back-up frequency of the first cognitive system in the target area and a period of time during which the back-up frequency of the first cognitive system in the target area is valid; and the terminal deleting the back-up frequency of the first cognitive system in the target area when the period of time, during which the back-up frequency of the first cognitive system in the target area is valid, expires.

15. The method according to claim 14, wherein when the period of time, during which the back-up frequency of the first cognitive system in the target area is valid, expires, the method further comprises:

the terminal requesting for the back-up frequency of the first cognitive system in the target area.

16. A cognitive system, which is a first cognitive system in a cognitive radio system comprising the first cognitive system, a second cognitive system and an incumbent system, wherein the cognitive system comprises:

a reference back-up frequency obtaining module configured to obtain, through a terminal, a back-up frequency, of the second cognitive system having overlap coverage in a target area, in an overlap coverage area; and a back-up frequency determining module configured to select at least one frequency from radio communication spectrum resources as a back-up frequency in the target area according to the back-up frequency of the second cognitive system in the overlap coverage area.

17. A terminal, comprising:
a reference back-up frequency obtaining module configured to obtain a back-up frequency of a second cognitive system in an overlap coverage area; and a reference back-up frequency transmitting module configured to transmit the back-up frequency, of the second cognitive system having overlap coverage in a target area, in the overlap coverage area to a first cognitive system when needed, so that the first cognitive system selects at least one frequency from radio communication spectrum resources as a back-up frequency in the target area according to the back-up frequency of the second cognitive system in the overlap coverage area.

\* \* \* \* \*